Patented Feb. 27, 1940

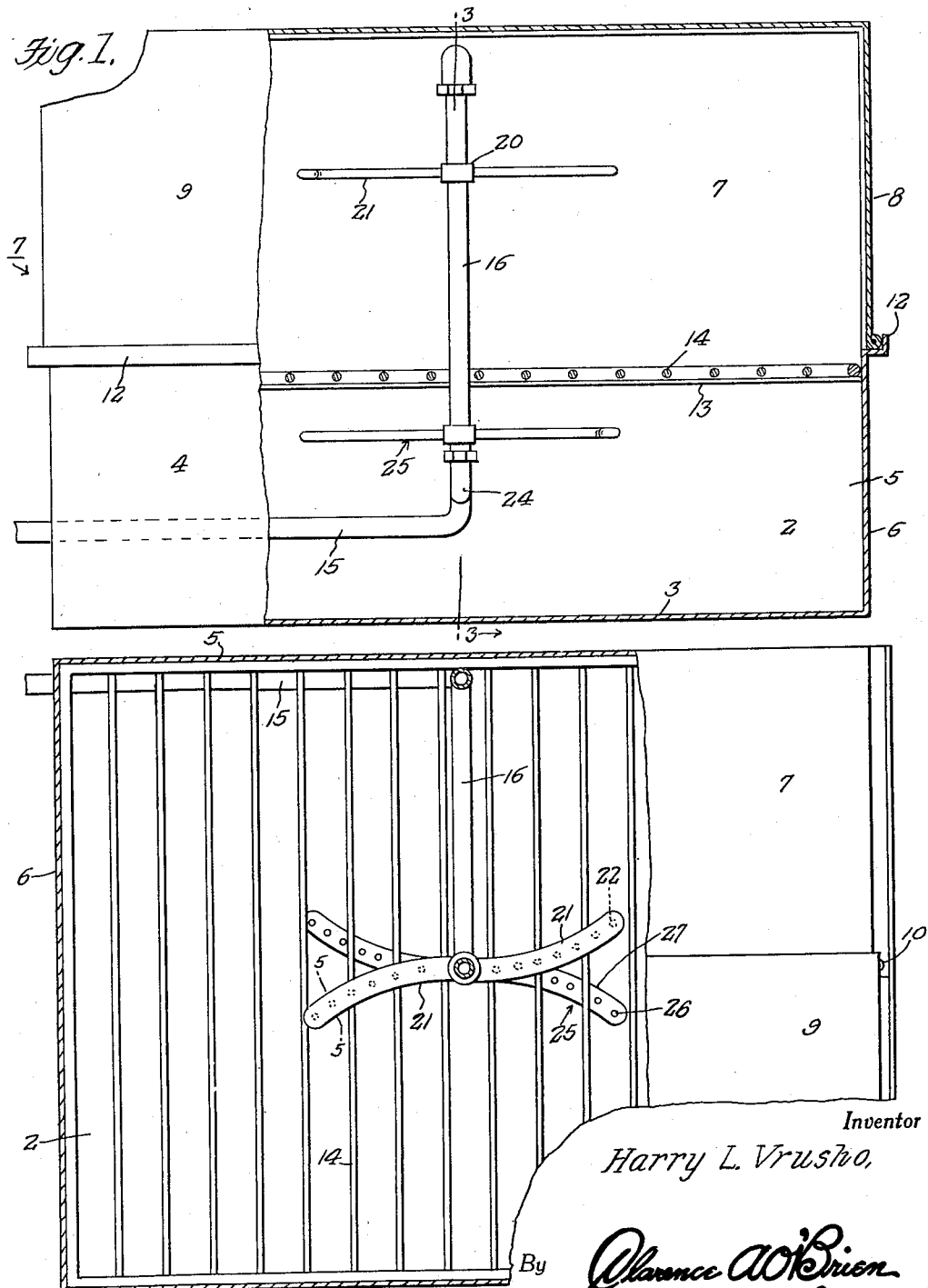

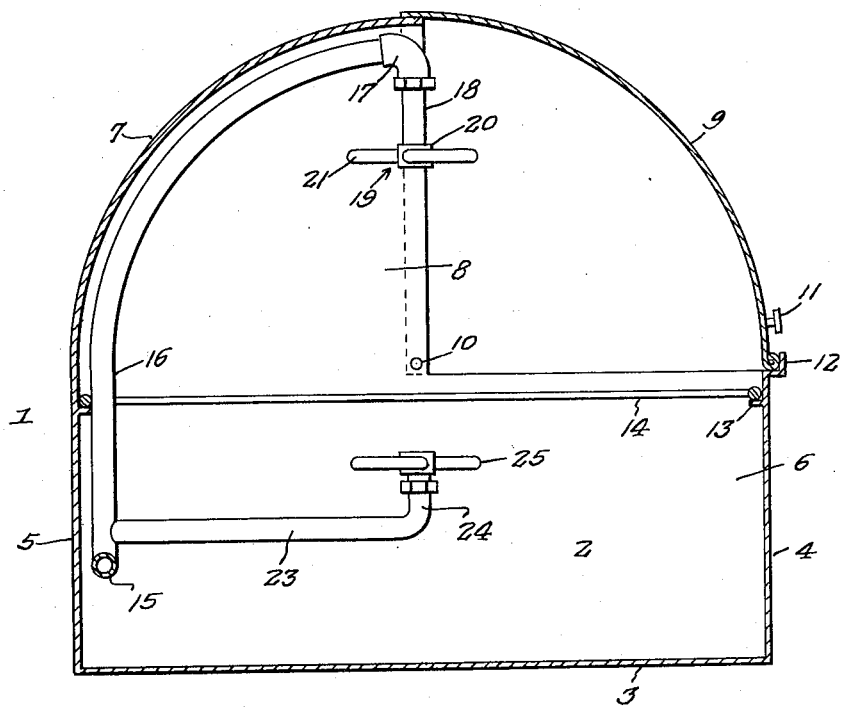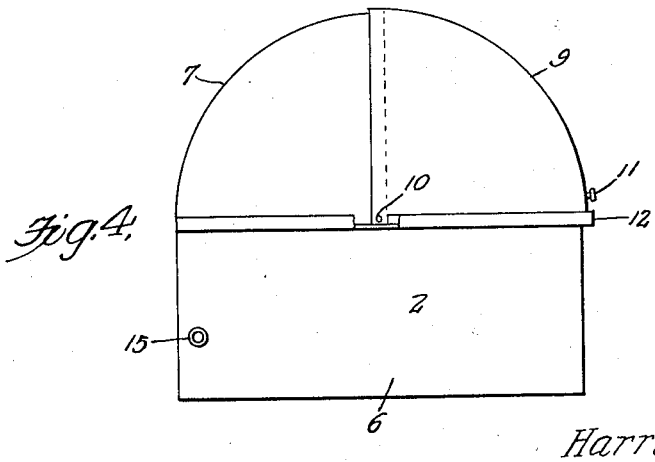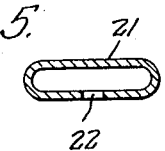

2,192,112

UNITED STATES PATENT OFFICE 2,192,112

STERILIZER

Harry Lambi Vrusho, Worcester, Mass.

Application September 1, 1938, Serial No. 228,026

1 Claim. (Cl. 21—78)

My invention relates to improvements in sterilizers for use more particularly in the kitchen in sterilizing dishes, pots and pans and the like, and other cooking and table accessories.

The principal object of the invention is to provide an inexpensive, efficient device of this character for use in sterilizing with hot water from the usual kitchen hot water supply line and which is readily portable and can be used in any sink.

Other, and subordinate objects, are also comprehended by my invention, all of which, together with the precise nature of my improvements, will be readily understood when the succeeding description and claim are read with reference to the drawings accompanying and forming part of this specification.

In said drawings:

Figure 1 is a view partly in front elevation and partly in longitudinal section of sterilizing apparatus constructed in accordance with my invention.

Figure 2 is a view partly in horizontal section and partly in top plan.

Figure 3 is a view in transverse section taken on line 3—3 of Figure 1 looking in the direction indicated by the arrows.

Figure 4 is a view in end elevation drawn to a reduced scale, and

Figure 5 is a detail view in transverse section taken on line 5—5 of Figure 2.

Referring to the drawings by numerals, the sterilizing apparatus of my invention comprises a vault 1 including a rectangular pan 2 having a bottom 3, front and rear walls 4 and 5 and end walls 6, and a canopy-like top 7 arching upwardly and forwardly over the pan 2 and forming together with extensions 8 of the end walls 6 a hood extending part-way over the pan 2 and open at the front side of the apparatus. A cover 9 corresponding in shape to that of the described hood is hinged, as at 10, to the extensions 8 for opening and closing the open side of said hood and is provided, as at 11, with a suitable knob for manipulation of the same. The pan 2 is provided with an upper right-angled edge flange 12 which seats the lower edge of the cover 9 in the closed position of said cover. Extending around the pan 2 in the upper part thereof is an internal flange 13 functioning as a seat for a rectangular grid 14 fitting into the pan 2 and removable therefrom.

Extending through one end of the pan 2 horizontally to the approximate center thereof is a water inlet pipe 15 spaced close to the back wall 5 and having an upstanding inner end 16 curving upwardly and forwardly alongside the top 7 to the open front of the described hood at which point it is provided with a downturned elbow 17 to which there is attached a short length depending pipe section 18. On the lower end of the pipe section 18 is a spray nozzle comprising a fitting 20 suitably secured to said end of the section 18 and a pair of oppositely curved perforated spray arms 21 extending from diametrically opposite sides of the fitting 20 and perforated along their bottom faces, as at 22, for the discharge of water therefrom, said arms 21 together with the fitting 20 forming a rotating reactive sprinkler disposed well above the grid 14.

Extending forwardly from the inner end 16 of pipe 15 is a pipe section 23 having an upturned free end 24 in vertical alignment with the pipe section 18 and in which is suitably mounted a second rotary reactive sprinkler 25 which is a counterpart of that previously described with the exception that the perforations 26 thereof are in the top of the arms 27 and said arms are oppositely curved relative to arms 21, the sprinkler 25 rotating oppositely relative to that previously described beneath the grid 14. The pipe 15 is provided externally of the pan 2 with any suitable means (not shown) for connection to the hot water faucet of the kitchen.

The manner in which the described apparatus is used and operated will be manifest. Suffice it to explain, that the articles to be sterilized are placed on top of the grid 14 and the hot water introduced into the vault 1 by way of the pipe 15 and under pressure, whereby the described sprinklers are rotated in opposite directions under reaction resulting from the sprays issuing therefrom in the usual manner. Thus a whirling hot water spray is discharged downwardly and upwardly against the articles and such articles are thoroughly cleaned and sterilized. Any suitable form of drain (not shown) may be provided in the pan 2.

The foregoing will, it is believed, suffice to impart a clear understanding of my invention without further explanation.

Manifestly, the invention, as described, is susceptible of modification without departing from the inventive concept and right is herein reserved to such modifications as fall within the scope of the subjoined claim.

What I claim is:

Sterilizing apparatus comprising a rectangular vault having a transversely curved top including a front closure, a horizontally disposed grid in said vault substantially midway between the top and bottom thereof, a water supply pipe extending through one end of the vault into the latter below said grid and close to the rear wall of the vault, said pipe having an upstanding end in the transverse center of the vault curving in conformity with the top of the vault and spaced close thereto, said end terminating at the top of the vault in the longitudinal center thereof, an upper sprinkler mounted on the terminal of said end below the same for rotation about a vertical axis under reaction incident to the discharge of water therefrom, a branch pipe extending forwardly and horizontally from said upstanding end in the plane thereof and below said grid, and a lower sprinkler mounted on said branch pipe for rotation in the axis of the upper sprinkler under reaction incident to discharge of water therefrom and oppositely relative to the direction of rotation of the sprinkler first mentioned.

HARRY LAMBI VRUSHO.